United States Patent

Takuwa

(10) Patent No.: US 9,637,337 B2
(45) Date of Patent: May 2, 2017

(54) SHEET FEEDING APPARATUS AND IMAGE PROCESSING APPARATUS

(71) Applicants: KABUSHIKI KAISHA TOSHIBA, Tokyo (JP); TOSHIBA TEC KABUSHIKI KAISHA, Tokyo (JP)

(72) Inventor: Noriyuki Takuwa, Yokohama Kanagawa (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/721,987

(22) Filed: May 26, 2015

(65) Prior Publication Data

US 2016/0347563 A1 Dec. 1, 2016

(51) Int. Cl.
| G06F 3/12 | (2006.01) |
| B65H 7/20 | (2006.01) |
| B65H 7/06 | (2006.01) |
| B65H 3/00 | (2006.01) |
| G06K 15/16 | (2006.01) |

(52) U.S. Cl.
CPC .......... *B65H 7/20* (2013.01); *B65H 3/00* (2013.01); *B65H 7/06* (2013.01); *G06K 15/16* (2013.01)

(58) Field of Classification Search
USPC .......... 358/498, 496, 1.15; 399/363, 367; 271/3.08, 3.14, 8.1
See application file for complete search history.

(56) References Cited

U.S. PATENT DOCUMENTS

| 5,726,762 A * | 3/1998 | Akada | H04N 1/00954 358/401 |
| 6,381,441 B1 * | 4/2002 | Byeon | B65H 5/34 271/265.02 |
| 7,991,306 B2 * | 8/2011 | Shibaki | G03G 15/6564 271/3.15 |
| 2004/0197108 A1 * | 10/2004 | Yamagata | H04N 1/00981 399/21 |
| 2005/0254870 A1 * | 11/2005 | Takahashi | G03G 15/6567 399/388 |
| 2009/0002424 A1 * | 1/2009 | Kiyama | B41J 3/543 347/16 |
| 2010/0303514 A1 * | 12/2010 | Ishii | G03G 15/161 399/301 |
| 2010/0303530 A1 * | 12/2010 | Inoue | G03G 15/6564 399/396 |
| 2012/0020367 A1 * | 1/2012 | Aulakh | H04L 47/621 370/412 |
| 2012/0133963 A1 * | 5/2012 | Oshima | H04N 1/00572 358/1.12 |

(Continued)

FOREIGN PATENT DOCUMENTS

JP 2012123387 A 6/2012

*Primary Examiner* — Jerome Grant, II
(74) *Attorney, Agent, or Firm* — Patterson & Sheridan, LLP (57) ABSTRACT

A sheet feeding apparatus includes a sheet conveying unit configured to convey a sheet along a conveyance path, a detecting unit configured to detect the sheet passing along the conveyance path, a control unit configured to determine an amount of delay of a sheet conveyed along the conveyance path based on the detection and determine information to be output based on the amount of the delay, and an output unit configured to output the information.

15 Claims, 8 Drawing Sheets

(56) References Cited

U.S. PATENT DOCUMENTS

| | | | | |
|---|---|---|---|---|
| 2015/0139675 A1* | 5/2015 | Maruyoshi | ......... | G03G 15/2028 399/68 |
| 2015/0239695 A1* | 8/2015 | Noda | ....................... | B65H 7/14 271/265.01 |
| 2015/0301491 A1* | 10/2015 | Yoshikawa | ............ | B65H 5/062 271/3.16 |

* cited by examiner

|  | DELAY INFORMATION | MAINTENANCE INFORMATION |
|---|---|---|
| LEVEL 1 | ~10% | NO PROBLEM |
| LEVEL 2 | 10~20% | ROLLER CLEANING IS NECESSARY |
| LEVEL 3 | 20~30% | ROLLER ADJUSTMENT IS NECESSARY |
| LEVEL 4 | 30~40% | ROLLER CLEANING IS NECESSARY AND ROLLER ADJUSTMENT IS NECESSARY |
| LEVEL 5 | 40%~ | ROLLER REPLACEMENT IS NECESSARY |

FIG. 8

|  | DELAY INFORMATION | TRANSPORT SETTING |
|---|---|---|
| LEVEL 1 | ~10% | SEPARATION FEED ROLLER SETTING SHOULD BE ADJUSTED |
| LEVEL 2 | 10~20% | SEPARATION FEED ROLLER FEED ROLLER SETTING SHOULD BE ADJUSTED |
| LEVEL 3 | 20~30% | SEPARATION FEED ROLLER ADJUSTMENT IS NOT SUFFICIENT |
| LEVEL 4 | 30~40% | SEPARATION FEED ROLLER ADJUSTMENT IS NOT SUFFICIENT |
| LEVEL 5 | 40%~ | SEPARATION FEED ROLLER ADJUSTMENT IS NOT SUFFICIENT |

SHEET FEEDING APPARATUS AND IMAGE PROCESSING APPARATUS

FIELD

Embodiments described herein relate generally to a sheet feeding apparatus and an image processing apparatus.

BACKGROUND

In a sheet feeding apparatus included in an image forming apparatus such as an MFP (Multi Function Peripheral), delay in sheet conveyance may occur. That is, a time at which the sheet conveyed by the sheet feeding apparatus reaches a conveyance point may be delayed. Whether or not this delay is likely to occur depends on several conditions, such as the type of sheets, sheet feed settings of the sheet feeding apparatus, deterioration of the sheet feeding apparatus due to age, or the like. Further, this delay may cause sheet jams.

However, a user or a maintenance person of the image forming apparatus may not know the causes of the delay. Because the cause of the delay is not known, the user or the maintenance person may not know how to change the sheet feed settings of the sheet feeding apparatus or how maintenance of the sheet feeding apparatus is to be performed.

DETAILED DESCRIPTION

In general, according to one embodiment, a sheet feeding apparatus includes a sheet conveying unit configured to convey a sheet along a conveyance path, a detecting unit configured to detect the sheet passing along the conveyance path, a control unit configured to determine an amount of delay of a sheet conveyed along the conveyance path based on the detection and determine information to be output based on the amount of the delay, and an output unit configured to output the information.

Hereinafter, a sheet feeding apparatus according to an embodiment will be described with reference to the drawings.

Figure 1:
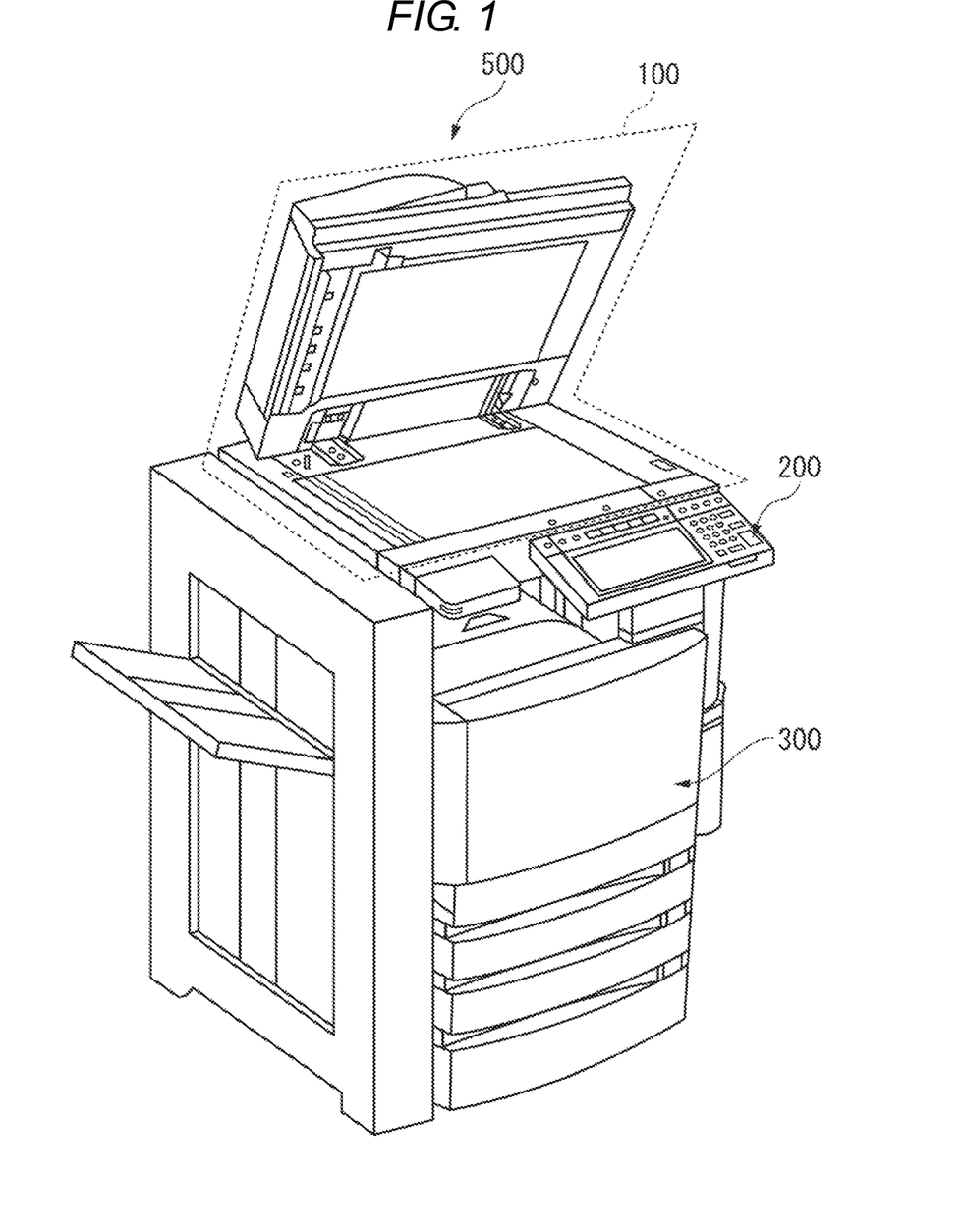
FIG. 1 is an outside view of an image processing apparatus including a sheet feeding apparatus according to an embodiment.

FIG. 1 is a perspective view of an image processing apparatus 500 including a sheet feeding apparatus 10 according to an embodiment. The image processing apparatus 500 is, for example, an MFP (Multi Function Peripheral). The image processing apparatus 500, for example, reads one or more sheets to generate digital data. For example, each of the sheets is an original, paper on which letters, pictures, or the like are described, or the like. The sheet may be formed of any material so long as the sheet is capable of being transported by the sheet feeding apparatus 10. In addition, in the following embodiment, the sheet will be described as "an original."

The image processing apparatus 500 includes an image reading unit 100, a control panel unit 200, an image forming unit 300, and a control device 400.

The image reading unit 100 reads an image on each original G. The image reading unit 100 outputs data (hereinafter, referred to as "image data") indicative of an image, which is read, (hereinafter, referred to as "a read image") to the image forming unit 300.

The control panel unit 200 displays a user interface through which operation input by a user is received. The control panel unit 200 includes, for example, a touch panel in which an operation section and a display section are integrally formed. The control panel unit 200 is connected to the control device 400 in a manner capable of communicating with each other. The operation section of the control panel unit 200 receives operation instructions of the sheet feeding apparatus 10, based on the operation by the user. The display section of the control panel unit 200 displays information to the user. For example, the displayed information is information output by the control device 400.

The image forming unit 300 includes a printer engine, an image processing substrate, and a printer engine control substrate. The image forming unit 300 receives image data generated by the image reading unit 100. The image forming unit 300 performs predetermined image processing with respect to the image data in accordance with the control by the image processing substrate. The image forming unit 300 forms an image corresponding to the image data subjected to the image processing on the sheet in accordance with the control by the printer engine control substrate. The image forming unit 300 may print an image corresponding to image data input from an external device through a network, on the sheet. In addition, the image forming unit 300 is not limited to an image forming unit that forms an image with toner, and may be an inkjet-type image forming unit.

The control device 400 is a computer which controls the image reading unit 100, the control panel unit 200, and the image forming unit 300. The control device 400 may be a group of individual computers. For example, the control device 400 may include a dedicated computer which controls the image reading unit 100 or the sheet feeding apparatus 10.

Figure 2:
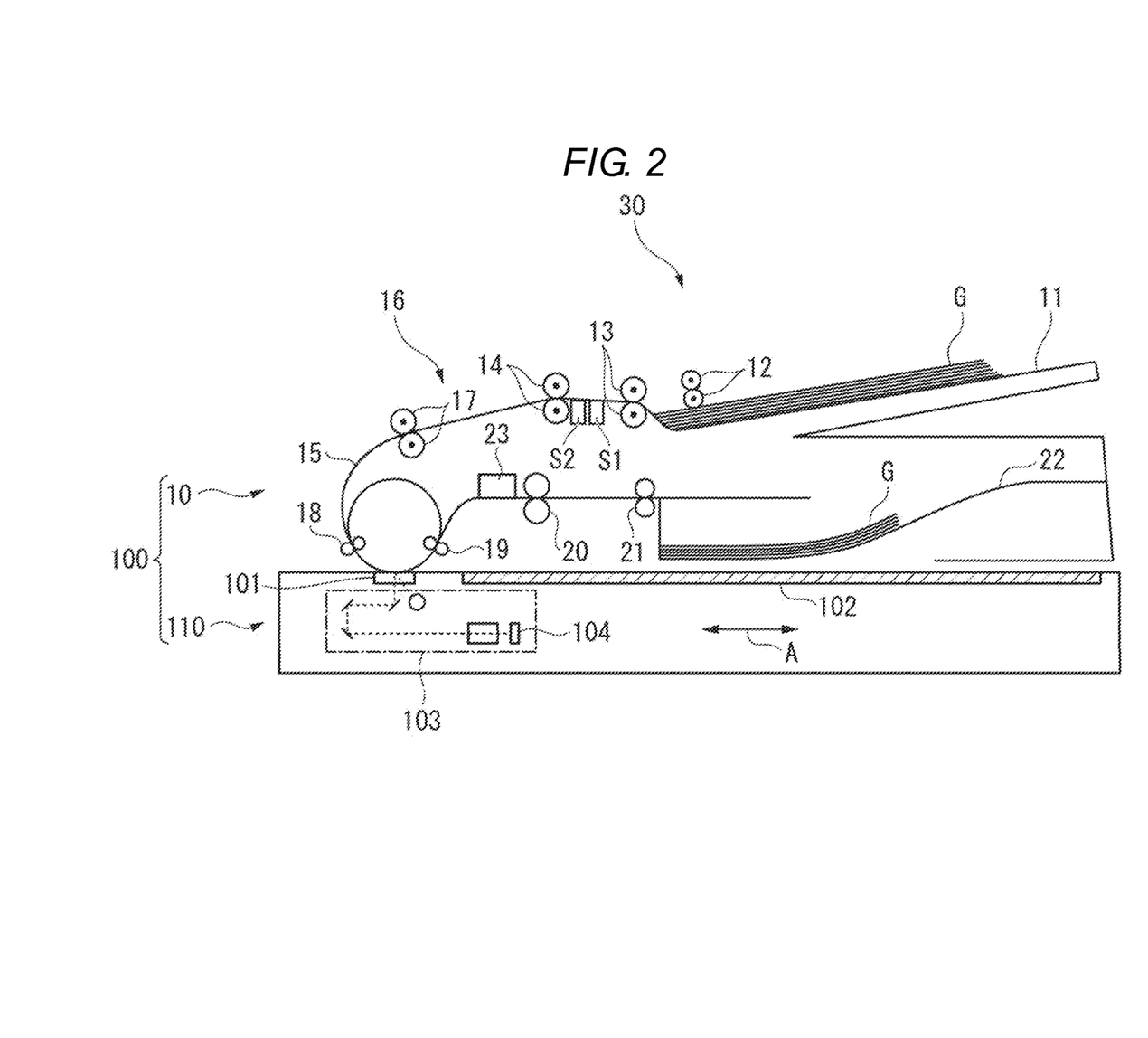
FIG. 2 is a cross-sectional view of the sheet feeding apparatus according to the embodiment.
Figure 3:
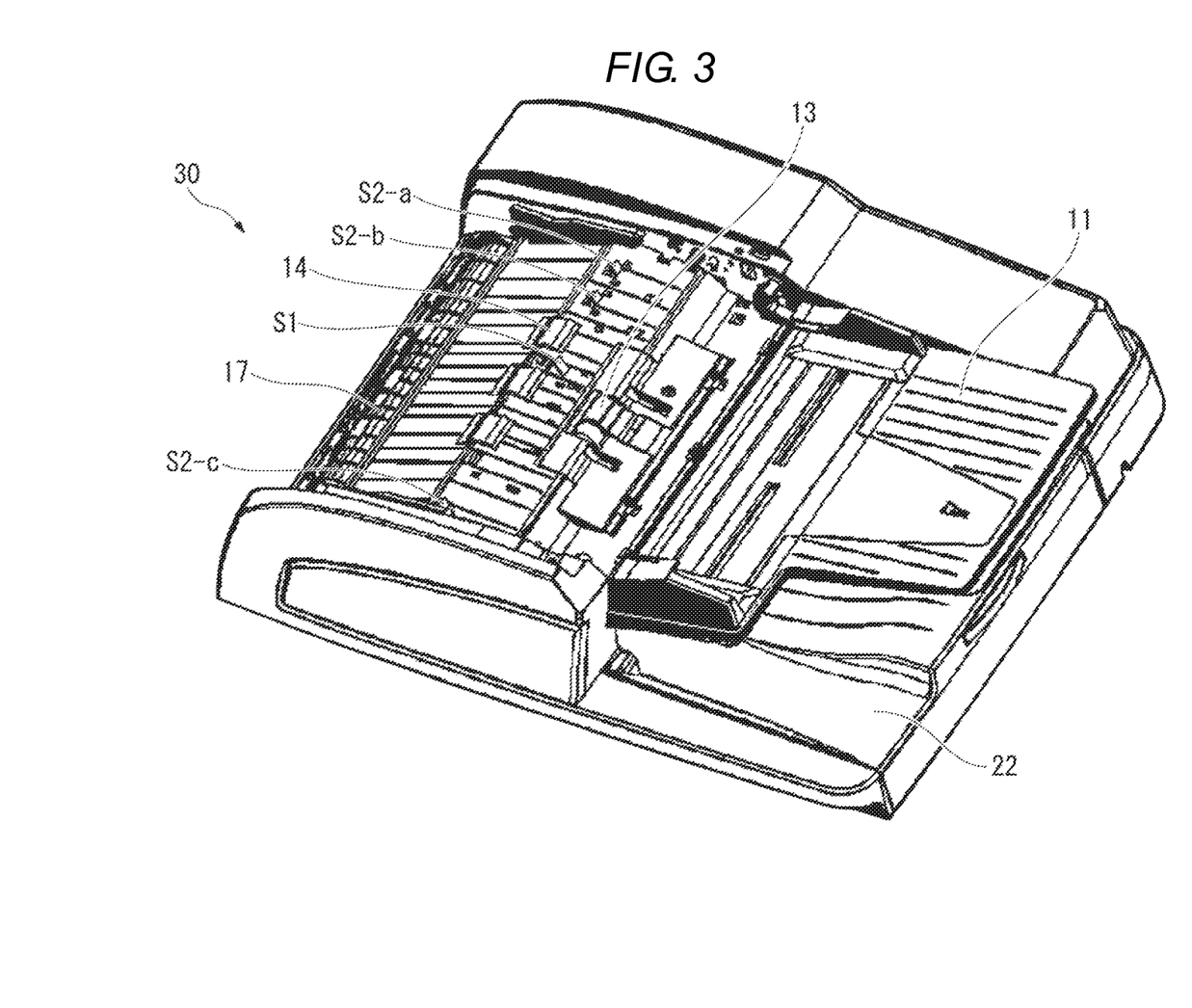
FIG. 3 is a top view of the sheet feeding apparatus according to the embodiment.
Figure 4:
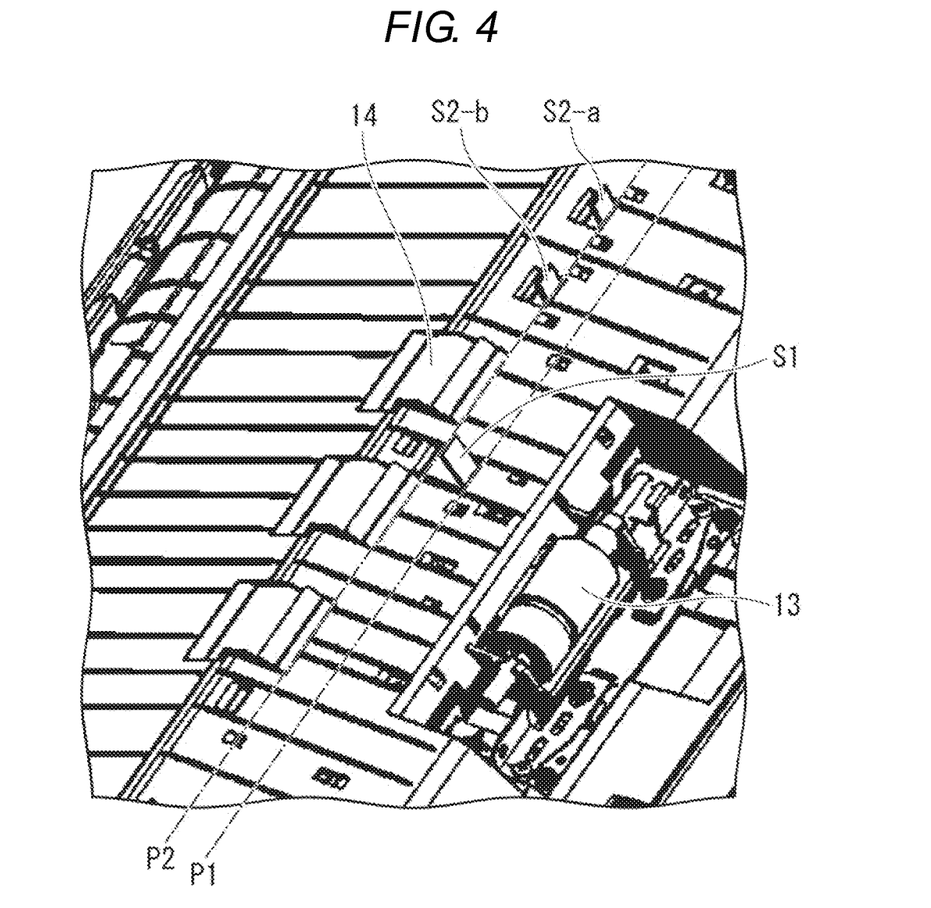
FIG. 4 is an enlarged top view of the sheet feeding apparatus according to the embodiment.

Next, detailed configuration of the sheet feeding apparatus 10 according to the embodiment will be described with reference to FIGS. 2 to 4. FIG. 2 is a cross-sectional view of the sheet feeding apparatus 10 according to the embodiment. FIG. 3 is a top view of the sheet feeding apparatus 10 according to the embodiment. FIG. 4 is an enlarged top view of the sheet feeding apparatus 10 according to the embodiment.

The image reading unit 100 includes a readout section 110 and the sheet feeding apparatus 10.

The readout section 110 includes a slit glass 101, a platen glass 102, an optical mechanism 103, and an image reading sensor 104.

The slit glass 101 is an elongated transparent member formed in a main scanning direction. The slit glass 101 is provided at a portion through which the original G transported by the sheet feeding apparatus 10 passes.

The platen glass 102 is a transparent member and has widths in the main scanning and sub-scanning directions. The platen glass 102 is provided at a portion on which the original G is placed. Thus, the platen glass 102 is a table on which the original G is placed.

The optical mechanism 103 emits light onto the original G moving on the slit glass 101 and guides light reflected by the original G to the image reading sensor 104. The optical mechanism 103 moves in an arrow A direction (see FIG. 2: the sub-scanning direction) along the platen glass 102 according to a control by a drive unit (not illustrated).

The image reading sensor 104 photoelectrically converts the light guided by the optical mechanism 103 and incident thereon into electric signals and outputs them as image data. The image reading sensor 104 is, for example, a CCD (Charge Coupled Device). The image reading sensor 104 reads an image on a surface, which is a first surface, of the original G moving on a glass surface of the slit glass 101. The image reading sensor 104 reads the image of the first surface of the original G placed on the platen glass 102. The image reading sensor 104 outputs the image data corresponding to the read image to the image forming unit 300.

The sheet feeding apparatus 10 includes an original tray 11, a transport mechanism 16, and a paper discharge tray 22.

The original tray 11 is a tray on which originals to be transported by the sheet feeding apparatus 10 are placed. An original G, which is a readout target of the readout section 110, is placed on the original tray 11.

The transport mechanism 16 transports the original G placed on the original tray 11 to the readout section 110. The transport mechanism 16 transports the original G read by the readout section 110 to the paper discharge tray 22.

The paper discharge tray 22 is a tray which receives the original G discharged by the sheet feeding apparatus 10. The original G, which is read by the readout section 110 and then transported by the transport mechanism 16, is discharged to the paper discharge tray 22.

Next, the transport mechanism 16 will be described in detail.

The transport mechanism 16 has a transport path 15 as a path through which the original G is transported. The original G placed on the original tray 11 is transported to the readout section 110 through the transport path 15. The original G read by the readout section 110 is transported to the paper discharge tray 22 through the transport path 15.

In addition, the transport mechanism 16 has a plurality of rollers for conveying the original G through the transport path 15. The plurality of rollers includes pickup rollers 12, separation feed rollers 13, resist rollers 14, intermediate rollers 17, pre-reading rollers 18, post-reading rollers 19, pre-discharge rollers 20, and discharge rollers 21.

In the embodiment, the pickup rollers 12, the separation feed rollers 13, the resist rollers 14, the intermediate rollers 17, the pre-reading rollers 18, the post-reading rollers 19, the pre-discharge rollers 20, and the discharge rollers 21 are sequentially provided from an upstream side of the transport path 15 to a downstream side thereof in a transport direction of the original G. The rollers are driven by a motor (not illustrated).

The pickup rollers 12 pick up the original G placed on the original tray 11. The pickup rollers 12 convey the original G into the transport path 15.

The separation feed rollers 13 include separation rollers and feed rollers. The separation feed rollers 13 are an example of "a pressure separation section." The separation rollers include a pressure adjustment mechanism which presses sheets using an elastic force of an elastic body such as a spring. A pressure of the separation rollers is preset by a user or a maintenance person. The separation rollers separate a plurality of originals G, when they are conveyed by the pickup rollers 12 at a time, by means of the preset pressure. The feed rollers convey each original G separated by the separation rollers to the resist rollers 14. By such a configuration, the separation feed rollers 13 prevent the stacked conveying (double feed) of the originals G.

The resist rollers 14 align a tip position of each original G conveyed from the separation feed rollers 13. The resist rollers 14 convey the original G, the tip position of which is aligned, toward the intermediate rollers 17.

The intermediate rollers 17 convey the original G conveyed from the resist rollers 14 to the pre-reading rollers 18.

The pre-reading rollers 18 convey the original G conveyed from the intermediate rollers 17 to the readout section 110.

The post-reading rollers 19 convey the original G read by the readout section 110 to the pre-discharge rollers 20.

The pre-discharge rollers 20 convey the original G conveyed from the post-reading rollers 19 to the discharge rollers 21.

The discharge rollers 21 convey the original G conveyed from the pre-discharge rollers 20 to the paper discharge tray 22.

The plurality of rollers is covered by a housing 30. In addition, a portion of each of the separation feed rollers 13, the resist rollers 14, and the intermediate rollers 17, among the plurality of rollers, is exposed outside the housing 30. A transport path 15 from the original tray 11 to the intermediate rollers 17 is formed along an upper surface of the housing 30. A transport path 15 located downstream with respect to the intermediate rollers 17 in a sheet conveying direction is formed within the housing 30. Along the upper surface of the housing 30, a plurality of sensors for detecting the original G moving on the transport path 15 is provided.

In the embodiment, the plurality of sensors includes an aligning sensor S1 and an original size detection sensor S2. In addition, the plurality of sensors is an example of "a detection section."

The aligning sensor S1 detects whether or not the original G is properly transported along the transport path 15. The aligning sensor S1 is provided at a position P1 between the separation feed rollers 13 and the resist rollers 14 along the transport path 15. The aligning sensor S1 detects whether or not the original G is properly transported between the separation feed rollers 13 and the resist rollers 14.

The original size detection sensor S2 detects the size of the original G transported along the transport path 15. The original size detection sensor S2 is provided at a position P2 between the separation feed rollers 13 and the resist rollers 14 along the transport path 15. The position P2 is positioned downstream with respect to the position P1 of the aligning sensor S1 in the sheet conveying direction.

For example, each of the aligning sensor S1 and the original size detection sensor S2 includes a plate-shaped member which is rotatably supported on the upper surface of the housing 30. Each of the plate-shaped members rotates between a retracted position and a standing position. The retracted position is a position along the upper surface of the housing 30 or a position below the upper surface of the housing 30. The standing position is a position above the housing 30. The plate-shaped member at the standing position is pushed by the transported original G. Thereby, the plate-shaped member at the standing position is moved to the retracted position. When the plate-shaped member is at the retracted position, a current is conducted in an electronic circuit (not illustrated) through the plate-shaped member. The movement of the plate-shaped member to the retracted position is detected based on the conduction of the current. Consequently, these sensors detect the original G transported along the transport path 15. Hereinafter, a state in which the plate-shaped member is at the retracted position is referred to as an ON state of each sensor. In addition, a state in which the plate-shaped member is at the standing position is referred to as an OFF state of each sensor.

For example, the original size detection sensor S2 includes sensors S2-a to S2-c and each of the sensors is provided at the position P2. The original size detection sensor S2 detects the size of the original G according to a combination of the sensors S2-a to S2-c in the ON state. A correlation between the combination of the sensors S2-a to S2-c in the ON state and the size of the original G is stored in the sheet feeding apparatus 10.

In addition, the aligning sensor S1 and the original size detection sensor S2 are not limited to the above-mentioned sensors, and may also be an optical sensor such as a CCD. In this case, the above sensor preferably has a dustproof structure capable of suppressing influence of contamination such as paper powder. The paper powder is dust caused by the original G contacting the various rollers.

Figure 5:
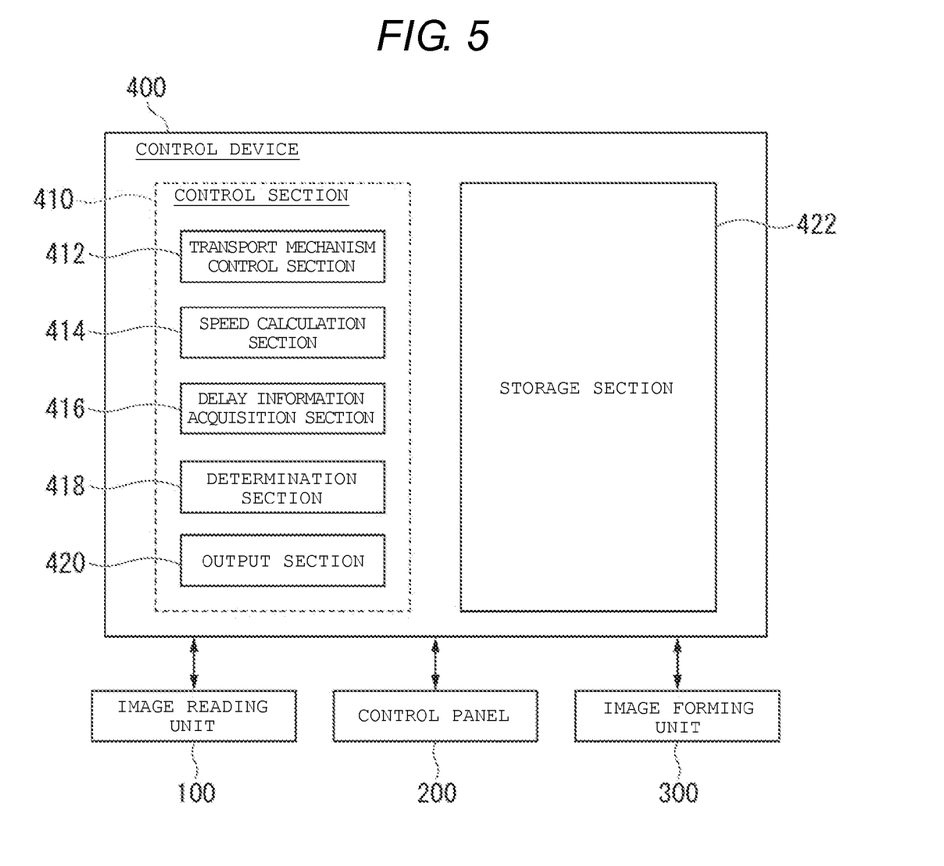
FIG. 5 is a block diagram of a control device of the image processing apparatus according to the embodiment.

FIG. 5 illustrates functional blocks of the control device 400 according to the embodiment.

The control device 400 includes a control section 410, a storage section 422, and a communication interface (not illustrated).

The control section 410 is a processor such as a CPU (Central Processing Unit). For example, the control section 410 is a software functional section which functions when programs stored in a storage device are executed by the processor. A portion or entirety of the sub-functional sections of the control section 410 may also be achieved by hardware such as an LSI or an ASIC. The LSI is an acronym of "Large Scale Integration." The ASIC is an acronym of "Application Specific Integrated Circuit."

The storage section 422 includes a ROM, an HDD, an SSD, an EEPROM, and a nonvolatile memory such as a flash memory. The ROM is an acronym of "Read Only Memory." The HDD is an acronym of "Hard Disk Drive." The SSD is an acronym of "Solid State Drive." The EEPROM is an acronym of "Electrically Erasable Programmable Read-Only Memory." The storage section 422 is controlled so as to store maintenance tables, transport speeds, delay times, and various threshold values. In addition, the storage section 422 may also be an external nonvolatile storage device, instead of a device incorporated in the control device 400. For example, the external nonvolatile storage device is a NAS (Network Attached Storage) device.

The communication interface is a hardware interface for performing communication with another device and other units of the sheet feeding apparatus 10.

The control section 410 includes a transport mechanism control section 412, a speed calculation section 414, a delay information acquisition section 416, a determination section 418, and an output section 420.

The transport mechanism control section 412 controls the transport mechanism 16 so as to transport the original G placed on the original tray 11 to the readout section 110 at certain intervals of time. In addition, the transport mechanism control section 412 controls the transport mechanism 16 so as to transport the original G read by the readout section 110 to the paper discharge tray 22.

The speed calculation section 414 calculates the transport speed of the transported original G, based on a timing T1 and a timing T2. The timing T1 is a timing at which the original G is detected by the sensor provided at the position P1. The timing T2 is a timing at which the original G is detected by the sensor provided at the position P2. The speed calculation section 414 calculates the transport speed of the transported original G, based on a time from the timing T1 to the timing T2 and a distance between the position P1 and the position P2. Hereinafter, the distance between the position P1 and the position P2 is referred to as "a transport distance."

The speed calculation section 414 may also calculate a mean transport speed based on a plurality of transport speeds. The mean transport speed is a mean value of the calculated transport speeds of the plurality of originals. The mean transport speed may also be a mean value of transport speeds of the plurality of originals G transported over a certain time. The mean transport speed may also be a mean value of transport speeds of the certain number of sheets of originals G. In the following description, the transport speed or the mean transport speed is simply referred to as "a transport speed."

The delay information acquisition section 416 acquires delay information, based on the transport speed calculated by the speed calculation section 414 and a preset reference speed. The delay information is information indicating the transport delay of the original G. The delay information acquisition section 416 may also acquire a difference (hereinafter, referred to as "a delay speed") between the transport speed and the reference speed as the delay information. The delay information acquisition section 416 may also acquire a value, which is equal to the delay speed divided by the reference speed, as the delay information. For example, the delay information acquisition section 416 may also acquire a time (delay time) indicating the transport delay as the delay information, based on the delay speed and the transport distance. The delay information acquisition section 416 may also acquire a value, which is equal to the delay time divided by a preset reference delay time, as the delay information. The reference delay time is a time used as a reference when determining whether or not the delay time is problematic in using the sheet feeding apparatus 10. The delay information acquisition section 416 may also acquire a number of times (hereinafter, referred to as "a number of times of delay") the delay speed has exceeded a preset threshold within a predetermined period, as the delay information.

When the mean transport speed is used, a transport delay caused when the original G is in a poor sates and a transport delay caused by aged deterioration of the sheet feeding apparatus 10 may be distinguished. The poor state of the original G is, for example, a state in which the original G is bent. The delay information acquisition section 416 may acquire information of the transport delay caused by the aged deterioration of the sheet feeding apparatus 10, regardless of the state of the transported original G, by means of using the mean transport speed.

The determination section 418 determines contents of maintenance information to be output, based on the delay information acquired by the delay information acquisition section 416 and a maintenance table. The maintenance table is pre-stored in the storage section 422. The maintenance table includes a combination of the delay information and the maintenance information. The maintenance information is an index referred when the user or the maintenance person performs the maintenance of the sheet feeding apparatus 10.

For example, when the value that is equal to the delay time divided by the reference delay time is acquired as the delay information, the determination section 418 may also operate as follows. When the delay information is a value from 0% to 10%, the determination section 418 determines that maintenance information indicating level 1 is output. When the delay information is a value from 10% to 20%, the determination section 418 determines that maintenance information indicating level 2 is output. When the delay information is a value from 20% to 30%, the determination section 418 determines that maintenance information indicating level 3 is output. When the delay information is a value from 30% to 40%, the determination section 418 determines that maintenance information indicating level 4 is output. When the delay information is a value from 40% to 100%, the determination section 418 determines that maintenance information indicating level 5 is output.

The output section 420 outputs the maintenance information determined by the determination section 418 to the display section of the control panel unit 200. Consequently, when the maintenance such as cleaning or component replacement is performed, the user or the maintenance person may refer to the maintenance information as one index.

Although the output section 420 is configured to output the maintenance information to the display section of the control panel unit 200, the embodiment is not limited thereto. For example, the output section 420 may also output the maintenance information to an external device connected through the communication interface.

Figure 6:
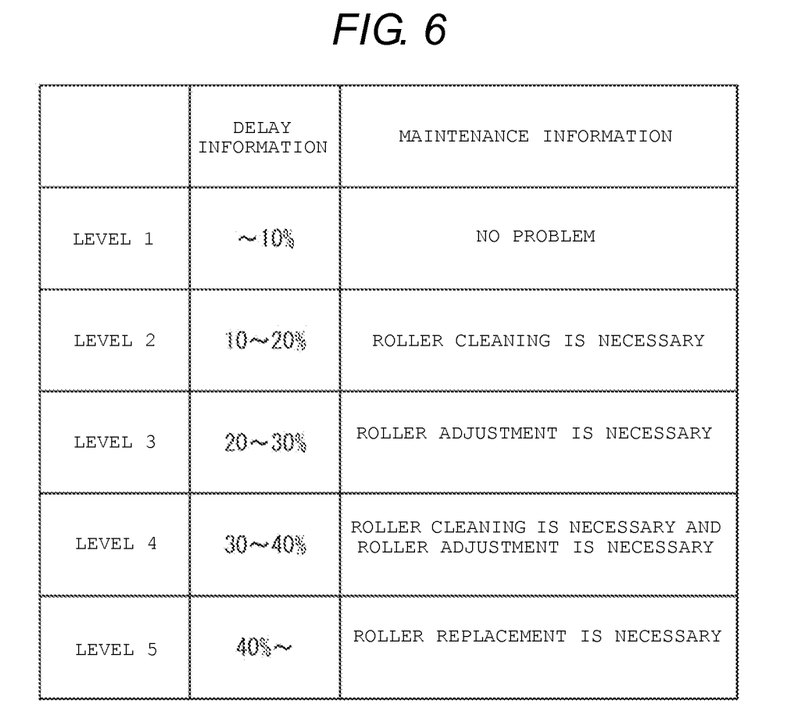
FIG. 6 is an exemplary maintenance table stored in a storage section of the control device according to the embodiment.

With reference to FIG. 6, the processing performed by the determination section 418 and the output section 420 will be described in detail. FIG. 6 is an exemplary maintenance table stored in the storage section 422 according to the embodiment.

For example, when the maintenance information indicating level 2 is determined by the determination section 418 to be output, the output section 420 outputs the maintenance information corresponding to the delay information of level 2 to the display section. In this case, the output section 420 outputs a message "roller cleaning is necessary," as the maintenance information to the display section.

For example, when the maintenance information indicating level 3 is determined by the determination section 418 to be output, the output section 420 outputs the maintenance information corresponding to the delay information of level 3 to the display section. In this case, the output section 420 outputs a message "roller adjustment is necessary," as the maintenance information to the display section.

For example, when the maintenance information indicating level 5 is determined by the determination section 418 to be output, the output section 420 outputs the maintenance information corresponding to the delay information of level 5 to the display section. In this case, the output section 420 outputs a message "roller replacement is necessary," as the maintenance information to the display section.

Consequently, the user or the maintenance person may recognize what kind of maintenance should be performed on the sheet feeding apparatus 10, by referring to the message displayed on the display section.

For example, when the displayed message is "roller cleaning is necessary," the user and the maintenance person can recognize that the cleaning of the separation feed rollers 13 should be performed.

For example, when the displayed message is "roller adjustment is necessary," the user or the maintenance person can recognize that the pressure adjustment mechanism of the separation feed rollers 13 should be adjusted. For example, the user or the maintenance person adjusts the pressure adjustment mechanism such that the pressure is strengthened. The pressure can be adjusted by changing the tension of the spring of the pressure adjustment mechanism. As a result, the sheet feeding apparatus 10 may enhance transport performance. The sheet feeding apparatus 10 may shorten the delay time within a normal delay time.

For example, when the displayed message is "roller replacement is necessary," the user or the maintenance person can recognize that the separation feed rollers 13 should be replaced.

Figure 7:
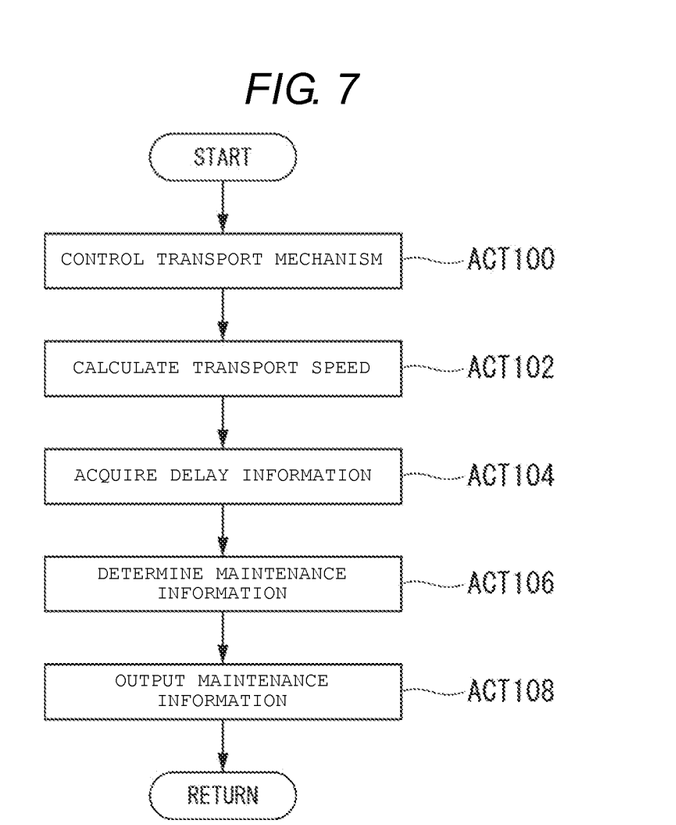
FIG. 7 is a flowchart of an operational flow carried out by the sheet feeding apparatus.

FIG. 7 is a flowchart of an operation carried out by the sheet feeding apparatus 10. First, the transport mechanism control section 412 controls the transport mechanism 16 to transport each sheet of the original G placed on the original tray 11 to the readout section 110 at certain intervals (ACT 100). In addition, the transport mechanism control section 412 controls the transport mechanism 16 to transport each sheet of the original G, which is transported at certain intervals to be read by the readout section 110, to the paper discharge tray 22. Next, the speed calculation section 414 calculates the transport speed of each sheet of the transported original G, based on the timing T1 and the timing T2 (ACT 102).

Next, the delay information acquisition section 416 acquires the delay information, based on the transport speed calculated by the speed calculation section 414 and the preset reference speed (ACT 104). Next, the determination section 418 determines the maintenance information to be output, based on the delay information acquired by the delay information acquisition section 416 and the maintenance table (ACT 106). Next, the output section 420 outputs the maintenance information determined by the determination section 418 to the display section of the control panel unit 200 (ACT 108). Thereby, the process of the flowchart is completed.

In accordance with the sheet feeding apparatus 10 of the embodiment described above, the transport speed of each sheet of the original is detected. The sheet feeding apparatus 10 acquires the delay information, which is information indicating the transport delay of the original, based on the transport speed detected by the detection section and the predetermined reference speed. The sheet feeding apparatus 10 determines the information related to the maintenance or settings of the sheet feeding apparatus 10, based on the delay information acquired by the delay information acquisition section. The sheet feeding apparatus 10 outputs the information determined by the determination section. Consequently, the user or the maintenance person may recognize the transport delay of the original. As a result, the proper maintenance may be performed by the user or the maintenance person.

Hereinafter, a modified example of the embodiment will be described.

First, a difference from the above-described embodiment is a difference in information determined by the determination section 418.

Figure 8:
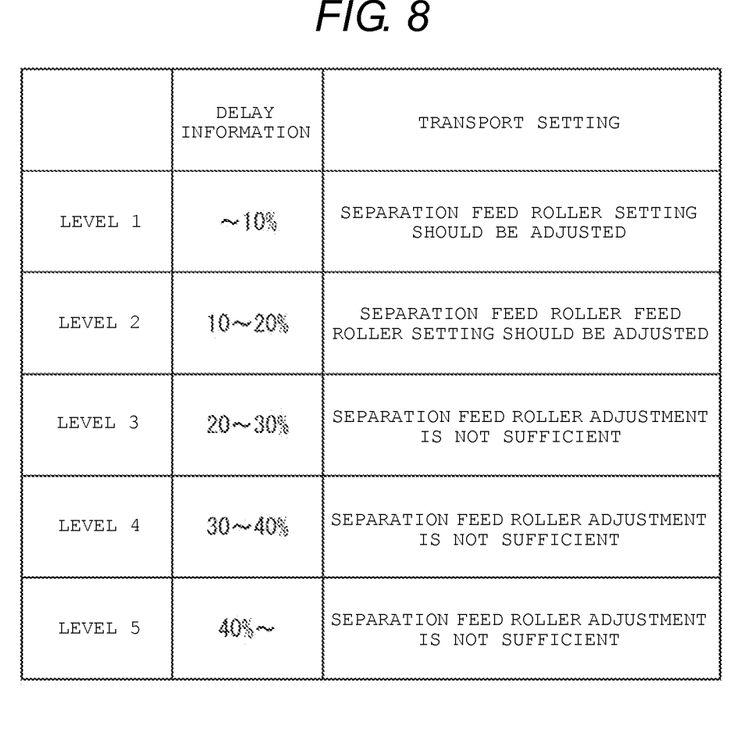
FIG. 8 is an exemplary table related to a sheet transport stored in a storage section of the control device according to a modified example of the embodiment.

The determination section 418 determines transport information to be output, based on a table (hereinafter, referred to as "a transport table") related to sheet transportation and the delay information acquired by the delay information acquisition section 416. The transport table is pre-stored in the storage section 422. The transport table indicates a combination of the delay information and the transport information. The transport information is information the user can refer to when the user uses the plurality of originals G in a state in which the originals G are adhered to each other. For example, the transport information is information about whether or not adjustment of the pressure adjustment mechanism of the separation feed rollers 13 can reduce the delay time sufficiently so as to be acceptable by the user.

The output section 420 outputs the transport information determined by the determination section 418 to the display section of the control panel unit 200.

Here, the processing performed by the determination section 418 and the output section 420 will be described in detail with reference to FIG. 8. FIG. 8 is an exemplary table related to the transport table stored in the storage section 422 according to a modified example of the embodiment.

For example, when the transport information of levels 1 or 2 is determined to be output by the determination section 418, the output section 420 outputs the transport information corresponding to the delay information of levels 1 or 2 to the display section. In this case, the output section 420 outputs a message "separation adjustment is possible," as the transport information to the display section.

When sheets, which were stapled or punched together, are used as the original, the sheets tend to be adhered to each other even after unstapled or unbundled. The user may determine whether or not to adjust the pressure adjustment mechanism of the separation feed rollers 13, by means of using the sheet feeding apparatus 10 of the embodiment. As a result, the processing suitable for the particular usage of the sheet feeding apparatus 10 may be performed.

Next, other modified examples will be described.

An aligning sensor S1 may also be located at a position P2 and an original size detection sensor S2 may also be located at a position P1.

A determination section 418 may also determine whether or not to perform the processing of the above-mentioned determination section 418, based on a number of delay times acquired by a delay information acquisition section 416 and a predetermined threshold value. For example, when the number of the delay times is less than the threshold value, the determination section 418 does not perform the overall operation of the above-mentioned processing. On the other hand, when the number of the delay times is greater than the threshold value, the determination section 418 performs the overall operation of the above-mentioned processing. By such a configuration, processing efficiency of the sheet feeding apparatus 10 may be enhanced.

In accordance with the sheet feeding apparatus of at least one embodiment described above, the transport speed of the original is detected. The sheet feeding apparatus acquires the delay information which is information indicating the transport delay of the original, based on the transport speed detected by the detection section and the predetermined reference speed. The sheet feeding apparatus determines the information related to the maintenance or settings of the own apparatus, based on the delay information acquired by the delay information acquisition section. The sheet feeding apparatus outputs the information determined by the determination section. Consequently, the user or the maintenance person may recognize the transport delay of the original. As a result, the proper maintenance may be performed by the user or the maintenance person.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sheet feeding apparatus comprising:
a plurality of sheet conveying rollers disposed along a conveyance path, the sheet conveying rollers including a first roller and a second roller that are consecutively arranged in this order in a sheet conveying direction;
a first sheet sensor disposed between the first roller and the second roller along the conveyance path;
a second sheet sensor disposed between the first sheet sensor and the second roller along the conveyance path;
a display; and
a controller configured to calculate a speed of each of sheets conveyed along the conveyance path based on a time difference between detection of the sheet by the first sheet sensor and detection of the sheet by the second sheet sensor, determine an amount of delay of the sheets based on the calculated speeds, and control the display to display first maintenance information for the first roller upon determining that the amount of delay is within a first range, and second maintenance information for the first roller upon determining that the amount of delay is within a second range.

2. The sheet feeding apparatus according to claim 1, wherein
the first roller is a separation roller configured to separate a sheet from one or more other sheets overlapping therewith.

3. The sheet feeding apparatus according to claim 2, wherein
the second roller is a resist roller.

4. The sheet feeding apparatus according to claim 1, wherein
each of the first and second sensors includes a plate that is located along the conveyance path and moved when said each of the sheets passes the sensor, and detects said each of the sheets by the moving of the plate.

5. The sheet feeding apparatus according to claim 1, wherein
the first sensor is an aligning sensor, and the second sensor is a sheet size sensor configured to detect a size of said each of the sheets in a width direction that is perpendicular to the sheet conveying direction.

6. An image processing apparatus comprising:
an image scanner; and
a plurality of sheet conveying rollers disposed along a conveyance path to the image scanner, the sheet conveying rollers including a first roller and a second roller that are consecutively arranged in this order in a sheet conveying direction;
a first sheet sensor disposed between the first roller and the second roller along the conveyance path;
a second sheet sensor disposed between the first sheet sensor and the second roller along the conveyance path; and
a controller configured to calculate a speed of each of sheets conveyed along the conveyance path based on a time difference between detection of the sheet by the first sheet sensor and detection of the sheet by the second sheet sensor, determine an amount of delay the sheets based on the calculated speeds, and control the display to display first maintenance information for the first roller upon determining that the amount of delay is within a first range, and second maintenance information for the first roller upon determining that the amount of delay is within a second range.

7. The image processing apparatus according to claim 6, wherein
the first roller is a separation roller configured to separate a sheet from one or more other sheets overlapping therewith.

8. The image processing apparatus according to claim 7, wherein
the second roller is a resist roller.

9. The image processing apparatus according to claim 6, wherein
each of the first and second sensors includes a plate that is located along the conveyance path and moved when said each of the sheets passes the sensor, and detects said each of the sheets by the moving of the plate.

10. The image processing apparatus according to claim 6, wherein
the first sensor is an aligning sensor, and the second sensor is a sheet size sensor configured to detect a size of said each of the sheets in a width direction that is perpendicular to the sheet conveying direction.

11. A method for operating a sheet feeding apparatus comprising:
conveying each of a plurality of sheets by a first roller and a second roller that are consecutively arranged in this order in a sheet conveying direction along a conveyance path;
detecting each of the sheets passing along the conveyance path by a first sheet sensor disposed between the first roller and the second roller along the conveyance path;
detecting said each of the sheets passing along the conveyance path by a second sheet sensor disposed between the first sheet sensor and the second roller along the conveyance path;
determining a speed of each sheet passing along the conveyance path based on a time difference between detection of the sheet by the first sheet sensor and detection of the sheet by the second sheet sensor;
determining an amount of delay of the sheets based on the determined speeds; and
displaying first maintenance information for the first roller upon determining that the amount of delay is within a first range, and second maintenance information for the first roller upon determining that the amount of delay is within a second range.

12. The method according to claim 11, wherein
the first roller is a separation roller configured to separate a sheet from one or more other sheets overlapping therewith.

13. The method according to claim 12, wherein
the second roller is a resist roller.

14. The method according to claim 11, wherein
each of the first and second sensors includes a plate that is located along the conveyance path and moved when the sheet passes therethrough, and detects the sheet by the moving of the plate.

15. The method according to claim 11, wherein the first sensor is an aligning sensor, and the second sensor is a sheet size sensor, the method further comprising:
detecting a size of said each of the sheet in a width direction that is perpendicular to the sheet conveying direction.

* * * * *